US008489160B2

(12) United States Patent
Xiao et al.

(10) Patent No.: US 8,489,160 B2
(45) Date of Patent: Jul. 16, 2013

(54) SLIDE-TYPE MOBILE TERMINAL AND SIGNAL PROCESSING METHOD THEREOF

(75) Inventors: Yu Xiao, Shenzhen (CN); Shougang Cheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/500,914

(22) PCT Filed: Apr. 8, 2010

(86) PCT No.: PCT/CN2010/071631
§ 371 (c)(1),
(2), (4) Date: Apr. 8, 2012

(87) PCT Pub. No.: WO2010/145270
PCT Pub. Date: Dec. 23, 2010

(65) Prior Publication Data
US 2012/0206212 A1    Aug. 16, 2012

(30) Foreign Application Priority Data
Oct. 26, 2009   (CN) .......................... 2009 1 0236563

(51) Int. Cl.
*H04M 1/00*     (2006.01)
*H04M 1/02*     (2006.01)
(52) U.S. Cl.
CPC .................. *H04M 1/0235* (2013.01)
USPC .................... 455/575.4; 455/575.7
(58) Field of Classification Search
CPC .................................................. H04M 1/0235
USPC .......... 455/550.1, 575.1, 575.3, 575.4, 575.7, 455/90.1, 90.3, 347, 351
See application file for complete search history.

(56) References Cited

U.S. PATENT DOCUMENTS

| 7,269,393 | B2 * | 9/2007 | Ota et al. ..................... 455/90.3 |
| 7,756,554 | B2 * | 7/2010 | Jung ........................... 455/575.3 |
| 7,962,186 | B2 * | 6/2011 | Cui et al. .................... 455/575.7 |
| 2011/0136554 | A1 * | 6/2011 | Wong et al. ................ 455/575.4 |

FOREIGN PATENT DOCUMENTS

| CN | 1829104 A | 9/2006 |
| CN | 201210731 Y | 3/2009 |
| KR | 20040092510 A | 11/2004 |

OTHER PUBLICATIONS

International Search Report for PCT/CN2010/071631 dated Jul. 21, 2010.

* cited by examiner

*Primary Examiner* — Thanh Le
(74) *Attorney, Agent, or Firm* — Stephen Yang; Ling Wu; Ling and Yang Intellectual Property

(57) ABSTRACT

A slide type mobile terminal and a method for processing signals thereof are disclosed in the present invention, wherein, a built-in auxiliary antenna is installed in an upper slide portion (10) of the slide type mobile terminal, meanwhile corresponding signal conversion modules (122, 312) are added to the upper slide portion (10) and a lower slide portion (30) respectively, which is used for converting an external high-frequency signal received by the built-in auxiliary antenna or an internal high-frequency signal generated by a main printed circuit board (PCB) from a single-ended signal to a differential signal, which are transmitted between the upper slide portion (10) and the lower slide portion (30) by a flexible printed circuit board (FPC) (20), so that the high-frequency signal is transmitted between the upper slide portion (10) and the lower slide portion (30) in form of differential signal.

8 Claims, 5 Drawing Sheets

SLIDE-TYPE MOBILE TERMINAL AND SIGNAL PROCESSING METHOD THEREOF

TECHNICAL FIELD

The present invention relates to the mobile terminal field, and particularly to a slide-type mobile terminal and a method for processing signals thereof.

BACKGROUND OF THE RELATED ART

At present, mobile communication terminals (called as mobile terminals for short) we use can be classified into the following several types according to structural shape: open-faced type, double-cover type, slide type, rotary type, and so on, and the slide type mobile terminal is a focus of the present invention.

With a progress of information technology and times, mobile terminals have become a necessary of people's lives, and has increasingly abundant application functions, not only the most basic communication functions, but also some auxiliary functions such as Global Position System (GPS), Bluetooth (BT), Wireless Fidelity (WIFI) are gradually developed to common must-have functions.

In order to receive and send a useful radio communication signal, an antenna is needed to be installed in the mobile terminal, and the antennas can be classified into built-in type antennas and external type antennas according to the installation structure of the antenna in the mobile terminal. For needs of attractive appearance, being practical and compactness, almost all the current mobile terminals adopt the built-in antennas; for a slide-type mobile terminal in general, the antenna is designed to be installed in the lower slide portion of the mobile terminal, which is mainly based on the consideration that a Flexible Printed Circuit board connecting the upper slide portion and the lower slide portion is not suitable for transmitting a high-frequency signal (such as a GPS signal received by a GPS antenna, a Bluetooth signal received and sent by a Bluetooth antenna and so on), and a metal slide rail between the upper slide portion and the lower slide portion will also have a greater impact on the antenna located on the top of the lower slide portion, which causes decrease of its performance relative to those open-faced or double-cover mobile terminals.

A form of a built-in antenna of a slide-type mobile terminal will be described as follows referring to a schematic diagram shown in FIG. 1 of a structure of a slide-type mobile terminal in the existing technology.

FIG. 1 shows a front view of a slide-type mobile terminal and side sectional views of the mobile terminal with its lower slide portion is in open state and closed state respectively. As shown in the figure, the slide-type mobile terminal in the existing technology includes:

a lower slide portion 101, which is configured with a main Printed Circuit Board (PCB) 102 used to control main functions of the mobile terminal, and some the mobile terminal components;

an upper slide portion 103, which is equipped with a mobile terminal component for implementing audio-video functions and a auxiliary PCB 104 for implementing other auxiliary functions.

The upper slide portion 103 may perform a slide relative to the lower slide portion 101, to implement an opening and closure of the lower slide portion 101. The upper slide portion 103 is connected with the lower slide portion 101 by a FPC, when the FPC is in a bending state, the upper slide portion 103 and the lower slide portion are overlapped, and the lower slide portion 101 is closed; when the upper slide portion 103 slides away relative to the lower slide portion along the metal slide rail in a length direction, the FPC is in a unfolded state, and now the lower slide portion 101 is open.

Wherein, a main antenna 105 used for implementing receiving and transmitting a communication signal is located in the bottom of the lower slide portion 101, and a GPS antenna 106 (auxiliary antenna) used for implementing GPS function is located on the top of the lower slide portion 101.

In general, either of the main antenna and the auxiliary antenna (such as a GPS antenna, a Bluetooth antenna and so on) is located in the lower slide portion 101 but not in the upper slide portion 103. If the main antenna and the auxiliary antenna are located in the upper slide portion 103, then a high-frequency signal generated by the main PCB 102 installed in the lower slide portion 101 can not be well transmitted to the upper slide portion 103, and a high-frequency signal received by the built-in antenna of the upper slide portion can not be well transmitted to the lower slide portion; if the main PCB 102 located in the lower slide portion 101 and the antenna located in the upper slide 103 are respectively connected with a coaxial cable with small energy loss, then flexibility and reliability of the coaxial cable when the lower slide portion 101 is in an open state and an closed state can not yet be ensured in the structure design; meanwhile, the coaxial cable is liable to be broken when the lower slide portion 101 is open and closed back and forth, so the transmission of the high-frequency signal between the upper slide portion and the lower slide portion can also not be ensured; while if the high-frequency signal is transmitted by the FPC connecting the upper slide portion and the lower slide portion, it will be vulnerable to interferences from other signals, and has greater loss which will greatly decrease performance of the antenna, even the functions of antenna can not be implemented. The above many factors make the location area of the antennas (including the main antenna and the auxiliary antenna) of the slide-type mobile terminal is limited to the lower slide portion 101.

In a design of a more and more popular multi-band multi-function mobile terminal, the mode of locating the antenna in the lower slide portion 101 will bring a lot of constraints to the design: a design of locating all of a plurality of multi-band multi-function antennas in the lower slide portion 101 generally causes a tight layout space of the lower slide portion 101 and constraints on the shape-design of the mobile terminal.

SUMMARY OF THE INVENTION

In view of that, the main purpose of the present invention is to provide a slide-type mobile terminal and a method for processing signals thereof, which can solve a problem that a high-frequency signal can not be well transmitted between the upper slide portion and the lower slide portion because a built-in antenna is located in the upper slide portion.

In order to achieve the above object, technical schemes of the present invention are implemented by the following ways of:

a slide-type mobile terminal provided in the present invention, comprising an upper slide portion and a lower slide portion interconnected with a Flexible Printed Circuit Board (FPC), wherein, the FPC is configured to transmit a high-frequency signal between the upper slide portion and the lower slide portion;

the upper slide portion comprises a built-in antenna and a first signal converting module;

the lower slide portion comprises a second signal converting module and a second antenna signal processing module; wherein:

the built-in antenna is configured to receive and transmit the high-frequency signal; the first signal converting module is configure to convert a high-frequency signal from the built-in antenna from a single-ended signal to a differential signal which is transmitted to the second signal converting module by the FPC; and is also configured to convert a high-frequency signal from the second signal converting module from a differential signal to a single-ended signal which is provided to the built-in antenna;

the second signal converting module is configured to convert a high-frequency signal from the second antenna signal processing module from a single-ended signal to a differential signal, which is transmitted to the first signal converting module by the FPC; and is also configured to convert a differential signal from the first signal converting module to a single-ended signal which is provided to the second antenna signal processing module; and the second antenna signal processing module is configured to generate and receive the high-frequency signal.

Further, the built-in antenna is an auxiliary antenna.

Wherein, the upper slide portion further comprises a first antenna signal processing module which connects the built-in antenna and the first signal converting module;

the first antenna signal processing module is configured to filter out noise signals outside a high-frequency signal band of a high-frequency signal from the built-in antenna, and provide the high-frequency signal after being filtered to the first signal converting module; and is also configured to filter out noise signals outside a high-frequency signal band of a high-frequency signal from the first signal converting module, and provide the high-frequency after being filtered to the built-in antenna.

Wherein, the first antenna signal processing module and the first signal converting module are located in an auxiliary Printed Circuit Board (PCB) of the upper slide portion.

Wherein, the second signal converting module and the second antenna signal processing module are located in the main PCB of the lower slide portion.

The present invention also provides a method for processing signals of a slide-type mobile terminal, comprising:

locating a built-in antenna and a first signal converting module in the upper slide portion of the mobile terminal; and locating a second signal converting module and a second antenna signal processing module in the lower slide portion of the mobile terminal;

the first signal converting module converting a high-frequency signal from the built-in antenna from a single-ended signal to a differential signal, which is transmitted to the lower slide portion by a FPC; or, converting a high-frequency signal from the lower slide portion from a differential signal to a single-ended signal, which is transmitted out by the built-in antenna;

the second signal converting module converting a high-frequency signal from the upper slide portion from a differential signal to a single-ended signal, which is processed by the second antenna signal processing module; or, converting a high-frequency signal from the second antenna signal processing module from a single-ended signal to a differential signal, which is transmitted to the upper slide portion by the FPC.

Further, the built-in antenna is an auxiliary antenna.

Before the built-in antenna transmits the high-frequency signal to the first signal converting module, the method further comprises: the first antenna signal processing module filtering out noise signals outside the high-frequency signal band of the high-frequency signal provided to the first signal converting module by the built-in antenna;

before the first signal converting module provides the high-frequency signal to the built-in antenna, the method further comprises: the first antenna signal processing module filtering out noise signals outside the high-frequency signal band of the high-frequency signal provided to the built-in antenna by the first signal converting module.

According to the scheme of locating the built-in antenna in the upper slide portion of the slide-type mobile terminal according to the present invention, a built-in auxiliary antenna such as a GPS antenna, a Bluetooth antenna, is installed in an upper slide portion of the slide type mobile terminal, meanwhile corresponding signal conversion modules are added to the upper slide portion and the lower slide portion respectively, which are used for converting an external high-frequency signal received by the built-in auxiliary antenna or an internal high-frequency signal generated by a main printed circuit board (PCB) from a single-ended signal to a differential signal, which is transmitted between the upper slide portion and the lower slide portion by a flexible printed circuit board (FPC), so that the high-frequency signal is transmitted between the upper slide portion and the lower slide portion in a form of differential signal, which may increase the anti-interference performance of the high-frequency signal, and improve the transmission performance of the high-frequency signals between the upper slide portion and the lower slide portion.

PREFERRED EMBODIMENTS OF THE PRESENT INVENTION

The technical scheme of the present invention will be further described in detail in combination with drawings and specific examples as follows.

According to the present invention, a built-in antenna is installed in an upper slide portion of a slide-type mobile terminal, and a signal conversion function mainly for converting a high-frequency signal from a single-ended signal to a differential signal for facilitating transmission in the FPC is added to the upper slide portion and the lower slide portion, so that a good transmission performance of the high-frequency signal between the upper slide portion and the lower slide portion can be realized.

The built-in antenna located in the upper slide portion of the slide-type mobile terminal in the present invention is an auxiliary antenna such as a GPS antenna, a Bluetooth antenna, and so on; the type of the main antenna depends on a standard of the mobile terminal, for example, the main antenna of a mobile terminal with GPS standard is GPS antenna, the main antenna of a mobile terminal with CDMA standard is CDMA antenna, wherein the main antenna is still located in the lower slide portion of the slide-type mobile terminal according to the existing technology.

Figure 1:
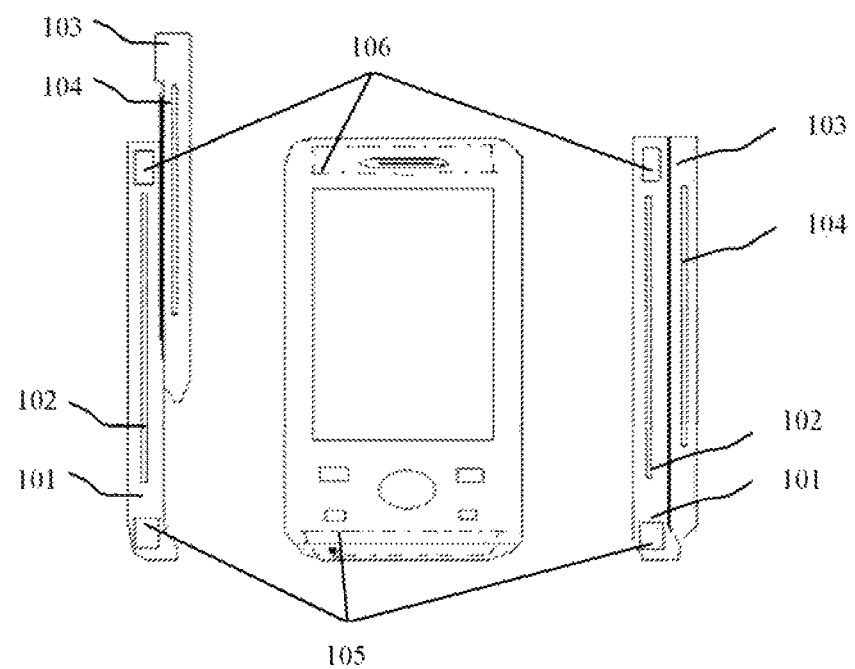
FIG. 1 is a schematic diagram of a structure of a slide-type mobile terminal in the existing technology.
Figure 2:
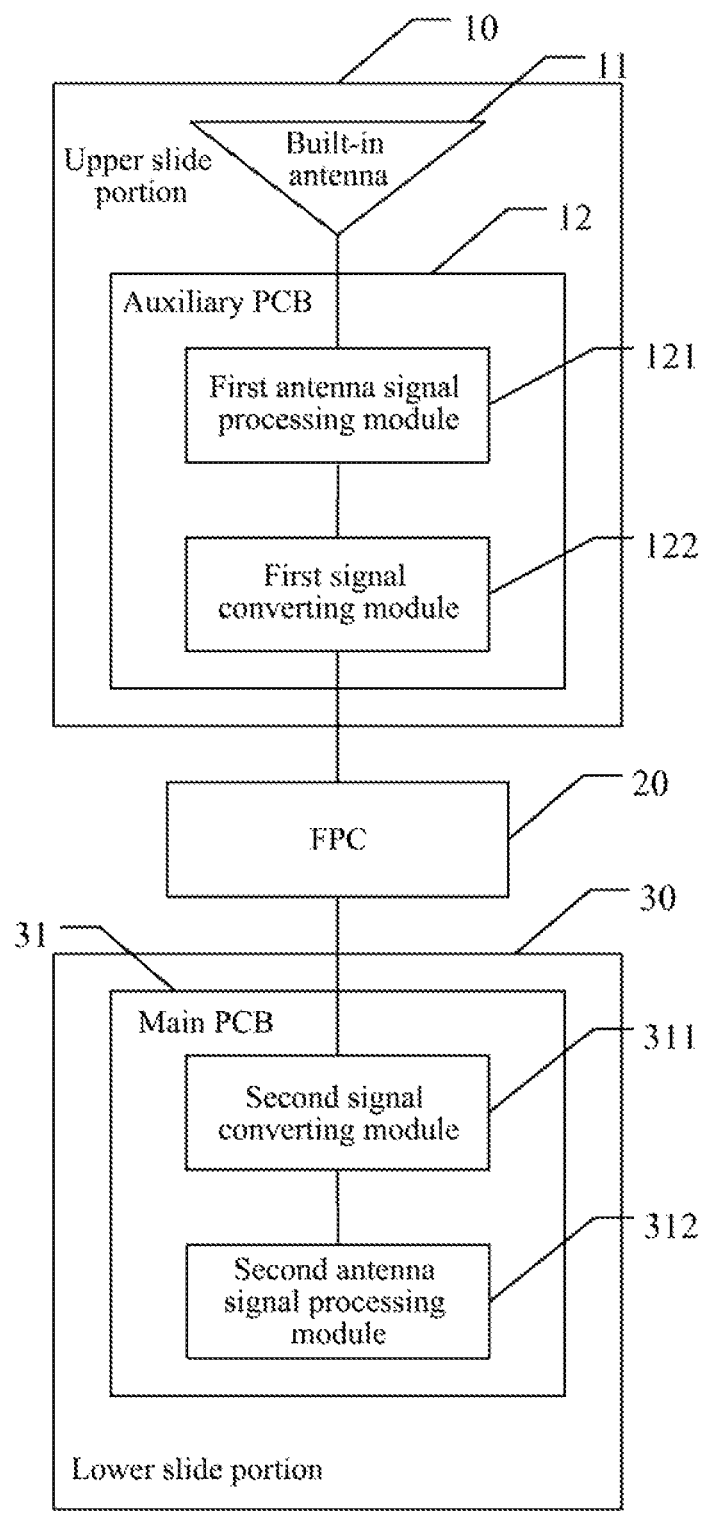
FIG. 2 is a schematic diagram of a structure of a system of a slide-type mobile terminal according to the present invention.

FIG. 2 shows a schematic diagram of a structure of a system of a slide-type mobile terminal according to the present invention, this slide-type mobile terminal includes two portions: an upper slide portion 10 and a lower slide portion 30 interconnected by a FPC 20 which is mainly used to transmit a high-frequency signal between the upper slide portion 10 and the lower slide portion 30; wherein:

the upper slide portion 10 includes a built-in antenna 11 and a first signal converting module 122; the lower slide portion 30 includes a second signal converting module 311 and a second antenna signal processing module 312;

the built-in antenna 11 is used to receive and send a high-frequency signal, for example, when the built-in antenna is a Bluetooth antenna, the built-in antenna 11 is used to transmit out a Bluetooth signal in the mobile terminal, and is also used to receive an Bluetooth signal from outside of the mobile terminal; when the built-in antenna is a GPS antenna, the built-in antenna 11 is used to receive an GPS signal from outside of the mobile terminal. The above Bluetooth signal and the GPS signal are both high frequency signals. Preferably, the built-in antenna 11 may be located on the top of the upper slide portion 10, and this will be described by the following examples herein.

The first signal converting module 122 is used to convert a high-frequency signal from the built-in antenna 11 from a single-ended signal to a differential signal which is transmitted to the second signal converting module 311 by a FPC; and is also used to convert a high-frequency signal from the second signal converting module 311 from a differential signal to a single-ended signal which is provided to the built-in antenna 11.

According to the present invention, a first signal converting module 122 is added to the upper slide portion 10, a high-frequency signal (which is a single-ended signal) from the built-in antenna 11 is converted to a differential signal which is transmitted to the second signal converting module 311 of the lower slide portion 30 by the FPC 20, thus the anti-interference performance of the transmission of the differential signal in the FPC 20 is stronger than the single-ended signal; a high-frequency (which is a differential signal) from the second signal converting module 311 of the lower slide portion 30 is recovered to a single-ended signal, for facilitating the built-in antenna 11 transmitting it out.

The second signal converting module 311 is used to convert a high-frequency signal from the second antenna signal processing module 312 from a single-ended signal to a differential signal, which is transmitted to the first signal converting module 122 by the FPC 20; and is also used to convert a differential signal from the first signal converting module 122 to a single-ended signal, which is provided to the second antenna signal processing module 312.

The second signal converting module 311 is added to the lower slide portion 30 according to the present invention, a high-frequency signal (which is a single-ended signal) from the second antenna signal processing module 312 is converted from a single-ended signal to a differential signal, and transmitted to the first signal converting module 122 of the upper slide portion 10 by the FPC 20, thus the anti-interference performance of the transmission of the differential signal in the FPC 20 is stronger than the single-ended signal; and a high-frequency signal (which is a differential signal) from the first signal converting module 122 of the upper slide portion 10 is recovered to a single-ended signal and provided to the second antenna signal processing module 312 for processing.

It can be seen that, functions of single-ended-to-differential conversion and differential-to-single-ended conversion may be implemented by either of the first signal converting module 122 and the second signal converting module 311, specifically, equipments, circuits or modules that can implement functions of single-ended-to-differential conversion and/or differential-to-single-ended conversion in the existing technology may be adopted; for example, the function of single-ended-to-differential conversion may be implemented by a simple balanced circuit in the existing technology or may be implemented by a packaged equipment Balun in the existing technology; the function of differential-to-single-ended conversion may be implemented by a filter in the existing technology. Moreover, when a differential signal is transmitted in the FPC 20, preferably, ground wires may be used up and down and on the left and right sides along the wiring for the differential signal in the FPC 20 to provide protection, and the spacing between a wiring of other signal and a single wiring of the differential signal in the same layer has to be greater than twice a width (W) of a separated wiring width, so as to ensure a security distance of 3W between the other signal and the differential signal, so that the probability of interference on and attenuation of a high-frequency signal (differential signal) transmitted in the FPC 20 may be minimized.

The second antenna signal processing module 312 is used to generate and receive a high-frequency signal. This module, after receiving a high-frequency signal from the second signal converting module 311, decapsulates the high-frequency signal to offer use of the high-frequency signal to the mobile terminal; this module may also generate a high-frequency signal (single-ended signal) which is processed by the signal converting module (311, 122) and then transmitted out by the built-in antenna 11.

In addition, the upper slide portion 10 further includes a first antenna signal processing module 121, which connects the built-in antenna 11 and the first signal converting module 122. A high-frequency signal from the built-in antenna 11, after noise signals outside the high-frequency signal band of which being filtered by the first signal processing module 121, is provided to the first signal converting module 122; a high-frequency signal from the first signal converting module 122, after noise signals outside the high-frequency signal band being filtered by the first signal processing module 121, is provided to the built-in antenna 11. So that signal quality of the high-frequency signal itself may be improved, facilitating the subsequent transmission. This module may adopt a filter with corresponding functions in the existing technology. It should be noted that, in the design of the mobile terminal, the first antenna signal processing module 121 may be close to the built-in antenna 11 as possible, thereby the loss in transmission of the high-frequency signal between the two may be reduced.

During a design of the mobile terminal, preferably, the first antenna signal processing module 121 and the first signal converting module 122 are located in the auxiliary PCB 12 of the upper slide portion 10; and the second signal converting module 311 and the second antenna signal processing module 312 are located in the main PCB 31 of the lower slide portion 30.

Figure 3:
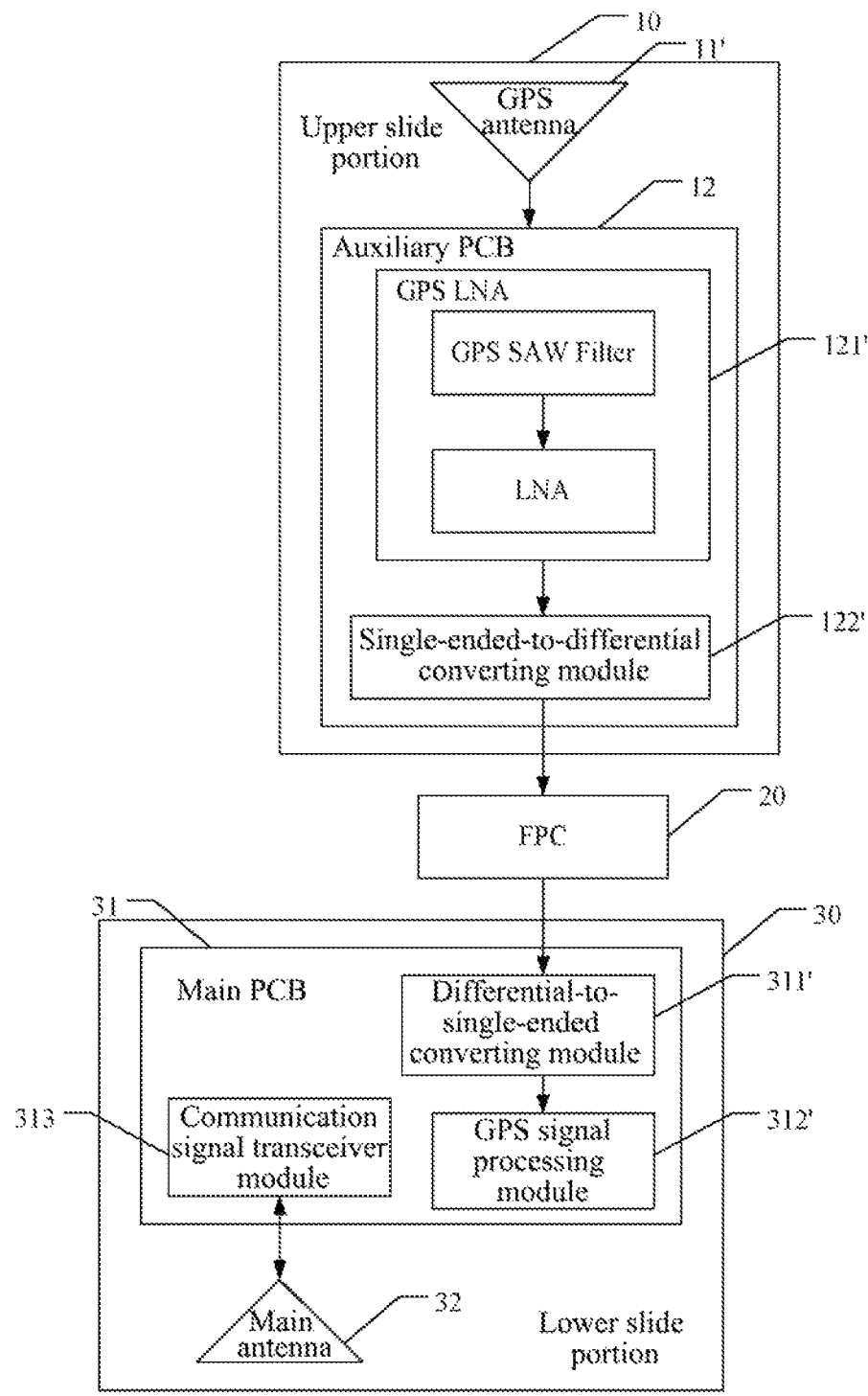
FIG. 3 is a schematic diagram of a structure of a system of an example of the slide-type mobile terminal according to the present invention.

A structure of a system of a slide-type mobile terminal and processing of a GPS signal based on the structure according to the present invention will be described, by taking the built-in antenna 11 as a GPS antenna as an example as follows. FIG. 3 shows a schematic diagram of a structure of system of en example of a slide-type mobile terminal according to the present invention, wherein a GPS antenna 11', a GPS LNA 121', a single-ended-to-differential converting module 122', a differential-to-single-ended converting module 311' and a GPS signal processing module 312' are respectively corresponding to the built-in antenna 11, the first antenna signal processing module 121, the first signal converting module 122 and the second signal converting module 311 and the second antenna signal processing module 312.

In addition, the main antenna 32 and the communication signal transceiver module 313 are still located in the lower slide portion 30 of the slide-type mobile terminal according to the existing technology, wherein the communication signal transceiver module 313 is located in the main PCB 31.

Based on the mobile terminal system of FIG. 3, a process of processing the GPS signal includes the followings.

1. The GPS antenna 11' provides a received GPS signal (high-frequency signal, single-ended signal) to the GPS LNA 121'.

2. The GPS LNA 121' includes a GPS Surface Acoustic Wave Filter (SAW Filter) which is used to filter out noise signals outside the GPS signal band in the GPS signal provided by the GPS antenna 11'; it should be noted that, when the built-in antenna is a GPS antenna, the GPS signal with a weak signal strength in the GPS signal may be amplified by the LNA in the GPS LNA 121'.

When the mobile terminal is designed, GPS LNA 121' may be close to GPS antenna 11' as much as possible, thereby reducing the loss of the GPS signal during transmission between GPS LNA 121' and GPS antenna 11'.

3. The GPS LNA 121' provides the processed GPS signal to the single-ended-to-differential converting module 122', and converts the GPS signal from a single-ended signal to a differential signal, which is transmitted to the lower slide portion 30 by the FPC 20.

Being transmitted in the FPC 20 in form of differential signal, the anti-interference performance of the GPS signal may be improved. Moreover, when the differential signal is transmitted in the FPC 20, preferably, ground wires may be used up and down and on the left and right sides along the wiring for the differential signal in the FPC 20 to provide protection, and the spacing between a wiring of other signal and a single wiring of the differential signal in the same layer has to be greater than twice a width (W) of a separated wiring width, so as to ensure a security distance of 3W between the other signal and the differential signal, so that the probability of interference on and attenuation of a GPS signal transmitted in the FPC 20 may be minimized.

4. The differential-to-single-ended converting module 311' of the lower slide portion 30 receives the GPS signal, and recovers the GPS signal from a differential signal to a single-ended signal and provides to the GPS signal processing module 312'.

5. The GPS signal processing module 312' decapsulates the GPS signal and then provides it to the mobile terminal for use.

When the built-in antenna 11 is a Bluetooth antenna, because the transmission of a Bluetooth signal is bi-directional, so the first signal converting module 122 and the second signal converting module 311 in the mobile terminal have functions of single-ended-to-differential conversion and differential-to-single-ended conversion at the same time; now the first antenna signal processing module 121 is a filter (which has a function of filtering noise signals) which can process a Bluetooth signal, and the second antenna signal processing module 312 is a Bluetooth signal processing module. In this mobile terminal, the main antenna and the communication signal transceiver module are still located in the lower slide portion of the slide-type mobile terminal according to the existing technology, wherein the communication signal transceiver module is located in the main PCB.

Figure 4:
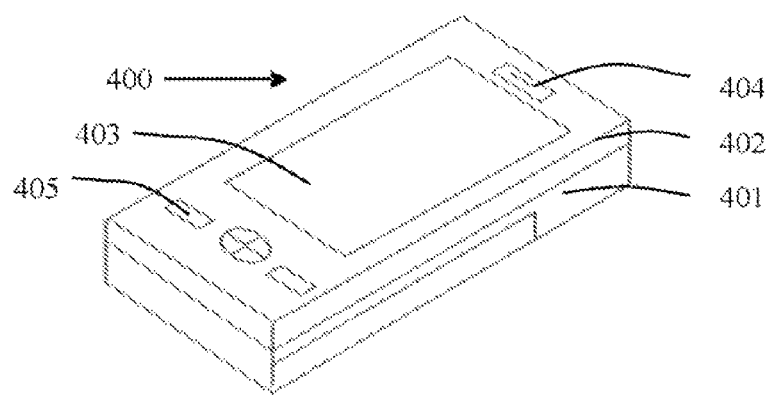
FIG. 4 is a stereogram of appearance of the slide-type mobile terminal in the example of the present invention.
Figure 5:
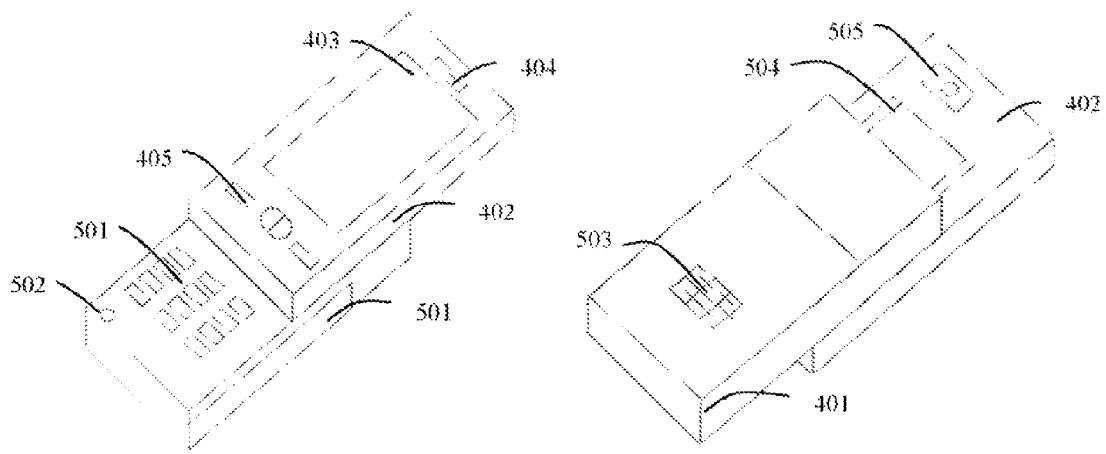
FIG. 5 is a stereogram of a sliding state of an upper slide portion relative to a lower slide portion of the slide-type mobile terminal according to the example of the present invention.
Figure 6:
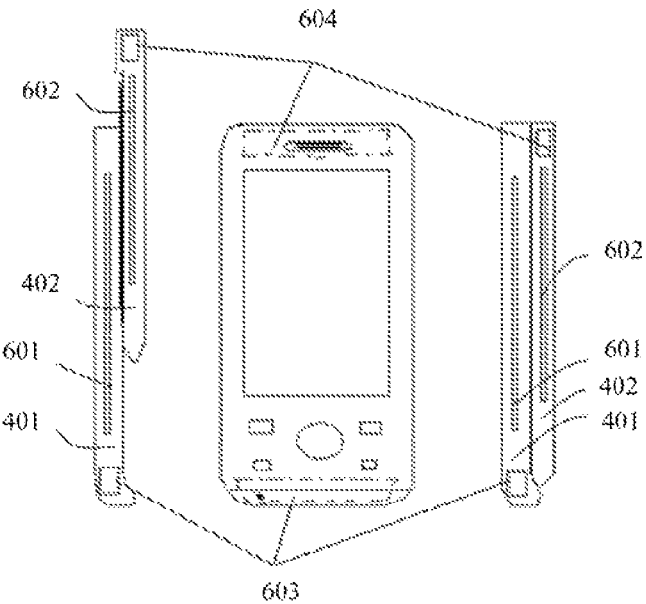
FIG. 6 is a schematic diagram of a location of a built-in GPS antenna in the upper slide portion and a main built-in main antenna in the lower slide portion of the slide-type mobile terminal according to the example of the present invention.

Based on a system structure of the slide-type mobile terminal of FIG. 3, a design scheme of a slide-type mobile terminal is given in the present invention, as a stereogram of the appearance of the slide-type mobile terminal in the example of the present invention as shown in FIG. 4, a stereogram of a sliding state of a upper slide portion relative to a lower slide portion of the slide-type mobile terminal according to the example of the present invention as shown in FIG. 5, and a schematic diagram of locations of a built-in GPS antenna in the upper slide portion and a main built-in main antenna in the lower slide portion of the slide-type mobile terminal according to the example of the present invention as shown in FIG. 6.

Wherein, the slide-type mobile terminal 400 includes: a lower slide portion 401, which is configured with some mobile terminal components such as a key 501, a microphone 502, a trumpet 503, and also is configured with a main PCB 601 used to control main functions of the mobile terminal; inside the main PCB 601 included a communication signal transceiver module 313 used to receive and transmit a communication signal, and a GPS signal processing module 312' used to process a GPS signal to implement a GPS function; a upper slide portion 402, which is connected with the lower slide portion 401 by a FPC, and may combine with the lower slide portion 401 by relatively sliding by a metal slide rail 504, to implement the opening and closure of the lower slide portion 401. The FPC connects the upper slide portion 402 and the lower slide portion 401, and when the FPC is in a bending state, the upper slide portion 402 and the lower slide portion 401 are overlapped, and the lower slide portion 401 is closed; when the upper slide portion 402 slides away relative to the lower slide portion 401 along the metal slide rail 504 in a length direction, the FPC is in a unfolded state, and now the lower slide portion 401 is open. In the upper slide portion 402 installed a mobile terminal component which can implement video-audio function and an auxiliary PCB 602 which can implement other auxiliary functions, such as a LCD display 403, a headphone 404, a camera 505, a key 405, and so on.

Wherein, the main antenna 603 used to receive and transmit a communication signal is located in the bottom of the lower slide portion 401, and is close to the communication signal transceiver module 313 as possible in the main PCB 601, thereby minimizing the loss of the communication signal when transmitted between the communication signal transceiver module 313 and the main antenna 603, so as to implementing a good transmission of the communication signal.

A GPS antenna 604 used to implement a GPS function is located on the top of the upper slide portion 402. The GPS antenna 604 may be a right-hand circular polarized Patch antenna, or may be a linear polarized chip antenna, or may be a built-in GPS antenna in other form suitable to the mobile terminal; an installation of the antenna may be in form of chip, or may be in form of fixed installation by using a stand or a structural member.

Figure 7:
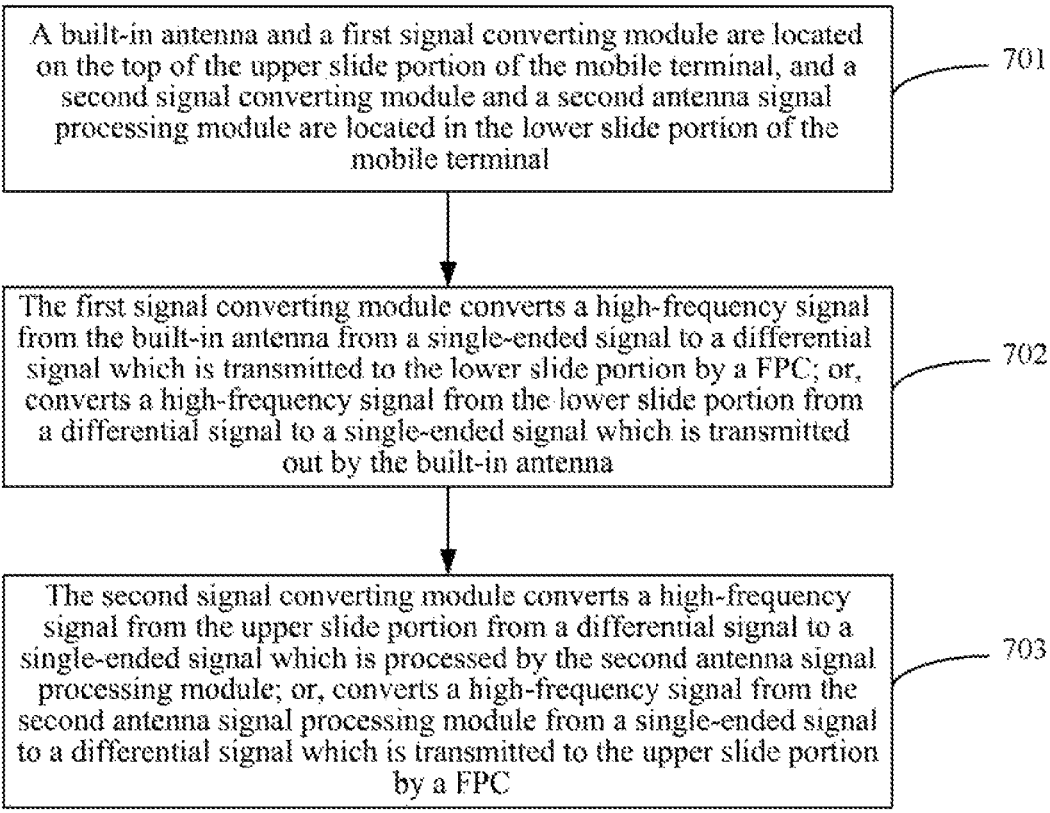
FIG. 7 is a flowchart of a method for processing signals of the slide-type mobile terminal according to the present invention.

A flowchart of signal processing of a mobile terminal will be described in combination with a slide-type mobile terminal system shown in FIG. 2. FIG. 7 is a flowchart of a method for processing signals of the slide-type mobile terminal according to the present invention, as shown in the diagram, and the flowchart comprises the following steps.

In step 701, a built-in antenna and a first signal converting module are located on the top of the upper slide portion of the mobile terminal, and a second signal converting module and a second antenna signal processing module are located in the lower slide portion of the mobile terminal.

Wherein, the built-in antenna is an auxiliary antenna such as a GPS antenna, a Bluetooth antenna. Further, the first signal converting module is located in an auxiliary PCB of the upper slide portion; the second signal converting module and the second antenna signal processing module are located in a main PCB of the lower slide portion.

In step 702, the first signal converting module converts a high-frequency signal from the built-in antenna from a single-ended signal to a differential signal which is transmitted to the lower slide portion by a FPC; or, converts a high-frequency signal from the lower slide portion from a differential signal to a single-ended signal which is transmitted out by the built-in antenna.

Thus it is demonstrated that, the first signal converting module implements a function of single-ended-to-differential conversion to a high-frequency signal from the built-in antenna; and implements a function of differential-to-single-ended conversion to a high-frequency signal from the lower slide portion.

Moreover, also a first antenna signal processing module may be set in the auxiliary PCB of the upper slide portion, which may filter out noise signals outside a high-frequency signal band of a high-frequency signal provided to the first signal converting module by the built-in antenna; or, filter out noise signals outside a high-frequency signal band of a high-frequency signal provided to the built-in antenna by the first signal converting module. Thus a performance of the high-frequency signal during a subsequent transmission can be improved.

In step 703, the second signal converting module converts a high-frequency signal from the upper slide portion from a differential signal to a single-ended signal which is processed by the second antenna signal processing module; or, converts a high-frequency signal from the second antenna signal processing module from a single-ended signal to a differential signal which is transmitted to the upper slide portion by a FPC.

Thus it is demonstrated that, the second signal converting module implements a function of single-ended-to-differential conversion to a high-frequency signal from the second antenna signal processing module; and implements a function of differential-to-single-ended conversion to a high-frequency signal from the upper slide portion.

It can be known from steps 702 and 703 that, a high-frequency signal is transmitted in form of a differential signal by the FPC between the upper slide portion and the lower slide portion. Thus an anti-interference of the high-frequency signal may be improved.

What is described above only shows preferred examples of the present invention, but not used to limit the protection scope of the present invention.

What is claimed is:

1. A slide-type mobile terminal, comprising an upper slide portion and a lower slide portion interconnected with a Flexible Printed Circuit Board (FPC), wherein,
the FPC is configured to transmit a high-frequency signal between the upper slide portion and the lower slide portion;
the upper slide portion comprises a built-in antenna and a first signal converting module; the lower slide portion comprises a second signal converting module and a second antenna signal processing module; wherein:
the built-in antenna is configured to receive and transmit the high-frequency signal; the first signal converting module is configure to convert a high-frequency signal from the built-in antenna from a single-ended signal to a differential signal which is transmitted to the second signal converting module by the FPC; and is also configured to convert a high-frequency signal from the second signal converting module from a differential signal to a single-ended signal which is provided to the built-in antenna;
the second signal converting module is configured to convert a high-frequency signal from the second antenna signal processing module from a single-ended signal to a differential signal, which is transmitted to the first signal converting module by the FPC; and is also configured to convert a differential signal from the first signal converting module to a single-ended signal which is provided to the second antenna signal processing module; and the second antenna signal processing module is configured to generate and receive the high-frequency signal.

2. The slide-type mobile terminal according to claim 1, wherein, the built-in antenna is an auxiliary antenna.

3. The slide-type mobile terminal according to claim 1, wherein, the upper slide portion further comprises a first antenna signal processing module which connects the built-in antenna and the first signal converting module;
the first antenna signal processing module is configured to filter out noise signals outside a high-frequency signal band of a high-frequency signal from the built-in antenna, and provide to the first signal converting module; and is also configured to filter out noise signals outside a high-frequency signal band of a high-frequency signal from the first signal converting module, and provide to the built-in antenna.

4. The slide-type mobile terminal according to claim 3, wherein, the first antenna signal processing module and the first signal converting module are located in an auxiliary Printed Circuit Board (PCB) of the upper slide portion.

5. The slide-type mobile terminal according to claim 1, wherein, the second signal converting module and the second antenna signal processing module are located in the main PCB of the lower slide portion.

6. A method for processing signals of a slide-type mobile terminal, comprising:
locating a built-in antenna and a first signal converting module in an upper slide portion of the mobile terminal; and locating a second signal converting module and a second antenna signal processing module in a lower slide portion of the mobile terminal;
the first signal converting module converting a high-frequency signal from the built-in antenna from a single-ended signal to a differential signal, which is transmitted to the lower slide portion by a FPC; or, converting a high-frequency signal from the lower slide portion from a differential signal to a single-ended signal, which is transmitted out by the built-in antenna;
the second signal converting module converting a high-frequency signal from the upper slide portion from a differential signal to a single-ended signal, which is processed by the second antenna signal processing module; or, converting a high-frequency signal from the second antenna signal processing module from a single-ended signal to a differential signal, which is transmitted to the upper slide portion by the FPC.

7. The method according to claim 6, wherein the built-in antenna is an auxiliary antenna.

8. The method according to claim 6, wherein, before the built-in antenna transmits the high-frequency signal to the first signal converting module, the method further comprises: the first antenna signal processing module filtering out noise signals outside the high-frequency signal band of the high-frequency signal provided to the first signal converting module by the built-in antenna;

before the first signal converting module provides the high-frequency signal to the built-in antenna, the method further comprises: the first antenna signal processing module filtering out noise signals outside the high-frequency signal band of the high-frequency signal provided to the built-in antenna by the first signal converting module.

* * * * *